(12) United States Patent
Kobayashi et al.

(10) Patent No.: US 7,965,870 B2
(45) Date of Patent: Jun. 21, 2011

(54) VEHICLE AND LANE MARK RECOGNITION APPARATUS

(75) Inventors: Sachio Kobayashi, Wako (JP); Tomoyoshi Aoki, Wako (JP); Takuma Nakamori, Wako (JP); Naoki Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 772 days.

(21) Appl. No.: 11/994,940

(22) PCT Filed: Jun. 23, 2006

(86) PCT No.: PCT/JP2006/312589
§ 371 (c)(1),
(2), (4) Date: Jan. 7, 2008

(87) PCT Pub. No.: WO2007/004439
PCT Pub. Date: Jan. 11, 2007

(65) Prior Publication Data
US 2009/0123065 A1    May 14, 2009

(30) Foreign Application Priority Data

Jul. 6, 2005  (JP) ................. 2005-197511

(51) Int. Cl.
| | |
|---|---|
| *G06K 9/00* | (2006.01) |
| *G06K 9/46* | (2006.01) |
| *G06K 9/66* | (2006.01) |
| *G05D 1/00* | (2006.01) |
| *G01C 22/00* | (2006.01) |
| *G06G 7/76* | (2006.01) |
| *G08G 1/00* | (2006.01) |
| *H04N 7/18* | (2006.01) |

(52) U.S. Cl. ........ 382/104; 382/103; 382/162; 382/164; 382/165; 382/190; 701/28; 701/117; 348/148

(58) Field of Classification Search ................ None
See application file for complete search history.

(56) References Cited

U.S. PATENT DOCUMENTS
6,137,531 A    10/2000 Kanzaki et al.
(Continued)

FOREIGN PATENT DOCUMENTS
EP    1 304 607 A1    4/2003
(Continued)

OTHER PUBLICATIONS

Kluge K et al: "The YARF system for vision-based road following", Mathematical and Computer Modelling UK, vol. 22, No. 4-7, Aug. 1995, pp. 213-233.

(Continued)

*Primary Examiner* — Tom Y Lu
*Assistant Examiner* — Thomas A Conway
(74) *Attorney, Agent, or Firm* — Arent Fox LLP

(57) ABSTRACT

A lane mark recognition apparatus includes an image capturing means (30) which captures a color image (IM_0) of a road via a color video camera (10), a specific-color-extracted image generating means (31) which generates a luminance-extracted image (IM_1) obtained by extracting white-color data from the color image (IM_0) and a yellow-color-extracted image (IM_2) obtained by extracting yellow-color data from the color image (IM_0), and a lane mark detection means (50a) which detects a white line and a yellow line from a composite image (IM_C) formed from the luminance-extracted image (IM_1) and the yellow-color-extracted image (IM_2) and outputs position data (Pd1) of the white line and position data (Pd2) of the yellow line.

6 Claims, 7 Drawing Sheets

U.S. PATENT DOCUMENTS

| | | | |
|---|---|---|---|
| 6,266,442 | B1 | 7/2001 | Laumeyer et al. |
| 2002/0106109 | A1 | 8/2002 | Retterath et al. |

FOREIGN PATENT DOCUMENTS

| | | |
|---|---|---|
| JP | S62-221800 A | 9/1987 |
| JP | 11-053691 A | 2/1999 |
| JP | 2002-123819 A | 4/2002 |
| JP | 2004-056785 A | 2/2004 |
| JP | 2005-100000 A | 4/2005 |

OTHER PUBLICATIONS

Kuo-Yu Chin et al: "Lane Detection Using Color-Based Segmentation", Intelligent Vehicles Symposium, 2005. Proceedings. IEEE Las Vegas, NV, USA Jun. 6-8, 2005, Piscataway, NJ, USA, IEEE, Jun. 6, 2005, pp. 706-711.

Cheng H et al: "Springrobot: A Prototype Autonomous Vehicle and Its Algorithms for Lane Detection", IEEE Transactions on Intelligent Transportation Systems, IEEE Service Center, Piscataway, NJ, US, vol. 5, No. 4, Dec. 1, 2004, pp. 300-308.

VEHICLE AND LANE MARK RECOGNITION APPARATUS

TECHNICAL FIELD

Cross-Reference to Related Application

This application is a National Stage entry of International Application No. PCT/JP2006/312589, filed Jun. 23, 2006, the entire specification claims and drawings of which are incorporated herewith by reference.

The present invention relates to a vehicle and lane mark recognition apparatus having a function of recognizing a lane mark provided on a road.

BACKGROUND ART

Conventionally, there is known a lane mark recognition apparatus for recognizing a lane mark for traffic lane division provided on a road from a color image obtained by an in-vehicle camera for capturing a road ahead of a vehicle (for example, refer to Japanese Patent Laid-Open No. 2002-123819).

The conventional lane mark recognition apparatus converts a color signal of each pixel in the color image to a luminance signal with a difference between the lane mark and portions other than the lane mark emphasized in order to detect the lane marks, a white line and a yellow line.

If the luminance of the color image is high, however, the yellow line cannot be extracted at the time of conversion to the luminance signal according to the circumstances of the road in some cases. Therefore, it is desired to improve the performance of detecting lane marks in the case where there are lane marks different in color such as the white line and the yellow line.

DISCLOSURE OF THE INVENTION

Problem to be Solved by the Invention

The present invention has been provided in view of the above background, and therefore it is an object of the present invention to provide a vehicle and lane mark recognition apparatus that can detect lane marks more accurately on a road where there are lane marks different in color.

Means to Solve the Problem

In order to achieve the above object of the present invention, there is provided a vehicle comprising: an imaging means; an image capturing means which captures a color image of a road via the imaging means; a specific-color-extracted image generating means which generates a plurality of specific-color-extracted images by performing a process of generating a specific-color-extracted image, which is obtained by extracting pixels of a specific color corresponding to the color of a lane mark in the road from the color image, with respect to a plurality of specific colors; and a lane mark detection means which detects the lane marks of the specific colors from a composite image based on the plurality of specific-color-extracted images generated by the specific-color-extracted image generating means.

Furthermore, a lane mark recognition apparatus according to the present invention comprises: an image capturing means which captures a color image of a road via an imaging means; a specific-color-extracted image generating means which generates a plurality of specific-color-extracted images by performing a process of generating a specific-color-extracted image, which is obtained by extracting pixels of a specific color corresponding to the color of a lane mark in the road from the color image, with respect to a plurality of specific colors; and a lane mark detection means which detects the lane marks of the specific colors from a composite image based on the plurality of specific-color-extracted images generated by the specific-color-extracted image generating means.

In the vehicle and lane mark recognition apparatus according to the present invention described above, the specific-color-extracted image generating means generates the plurality of specific-color-extracted images obtained by extracting the pixels of the specific colors corresponding to the lane mark colors, respectively. In this instance, the pixel region having the corresponding lane mark color is more distinct from the pixel regions having other colors in each specific-color-extracted image, and therefore the lane mark detection means can detect the lane mark of each specific color by using each specific-color-extracted image.

Furthermore, the lane mark detection means detects the lane marks of the specific colors from a composite image based on the plurality of specific-color-extracted images generated by the specific-color-extracted image generating means.

Furthermore, according to the vehicle and lane mark recognition apparatus, the composite image is generated by combining the plurality of specific-color-extracted images, each of which is obtained by extracting the pixels of the corresponding specific color, and therefore the lane mark region having each specific color in the color image is separated from other color regions in the composite image. Accordingly, the lane mark detection means can detect the lane marks of the respective specific colors accurately from the composite image.

Furthermore, in the vehicle and lane mark recognition apparatus according to the present invention, the lane mark detection means generates the composite image by performing a process of adding data of a level equal to or higher than a threshold value for determining whether the specific color is a first specific color in a first specific-color-extracted image, in the case where a corresponding pixel in a specific-color-extracted image other than the first specific-color-extracted image has a specific color, for data of each pixel in the first specific-color-extracted image, which is obtained by extracting pixels of the first specific color, among the plurality of specific-color-extracted images generated by the specific-color-extracted image generating means.

According to the present invention described above, if the composite image is generated by performing the process of adding the data whose level is equal to or higher than the threshold value when the corresponding pixel in the specific-color-extracted image other than the first specific-color-extracted image has the specific color for data of each pixel in the first specific-color-extracted image, the data of the pixel corresponding to the pixel of the specific color in the specific-color-extracted image other than the first specific-color-extracted image has the level where the specific color is determined to be the first specific color in the composite image. Therefore, the lane mark detection means can easily detect the lane marks of the specific colors on the basis of the pixels having data whose level is equal to or higher than the threshold value in the composite image.

Furthermore, in the vehicle and lane mark recognition apparatus according to the present invention, the lane mark detection means generates the composite image by performing a process of comparing data levels of corresponding pixels between the first specific-color-extracted image, which is obtained by extracting the first specific-color data, among the plurality of specific-color-extracted images generated by the specific-color-extracted image generating means and a level-matched image, which is obtained by matching the data level of the pixel of the specific color in the specific-color-extracted image other than the first specific-color-extracted image to the data level of the pixel of the first specific color in the first specific-color-extracted image, and considering data of the highest level as data of the corresponding pixel in the composite image.

According to the present invention described above, if the composite image is generated by performing the process of comparing the data levels of the corresponding pixels between the first specific-color-extracted image and the level-matched image and considering the data of the highest level as the data of the corresponding pixel in the composite image, the data level of the pixel of each specific color in the composite image is matched to the data level of the pixel of the first specific color in the first specific-color-extracted image. Therefore, the lane mark detection means can easily detect the lane mark of each specific color on the basis of the pixel having the data of the same level as the data of the pixel of the first specific color in the composite image.

Furthermore, in the vehicle and lane mark recognition apparatus according to the present invention, the lane mark detection means detects the lane mark of each specific color by performing a process of detecting the lane mark of the corresponding specific color for each of the specific-color-extracted images generated by the specific-color-extracted image generating means.

According to the present invention described above, the lane mark detection means detects the lane mark of the specific color from each of the specific-color-extracted images generated by the specific-color-extracted image generating means, and therefore the lane mark detection means can detect the lane mark of each specific color accurately while preventing the effect of other specific colors.

It is a block diagram of a vehicle equipped with a lane mark recognition apparatus according to first and second embodiments of the present invention.

FIG. 2

It is an explanatory diagram of an image in detecting a lane mark.

FIG. 3

It is a flowchart of a lane mark detection process according to the first embodiment.

FIG. 4

It is an explanatory diagram of image composition according to the first embodiment.

FIG. 5

It is a flowchart of a lane mark detection process according to the second embodiment.

FIG. 6

It is an explanatory diagram of image composition according to the second embodiment.

FIG. 7

It is a block diagram of a vehicle equipped with a lane mark recognition apparatus according to a third embodiment related to the present invention.

BEST MODE FOR CARRYING OUT THE INVENTION

Preferred embodiments of the present invention will be described below with reference to FIG. 1 to FIG. 6.

First Embodiment

Figure 1:
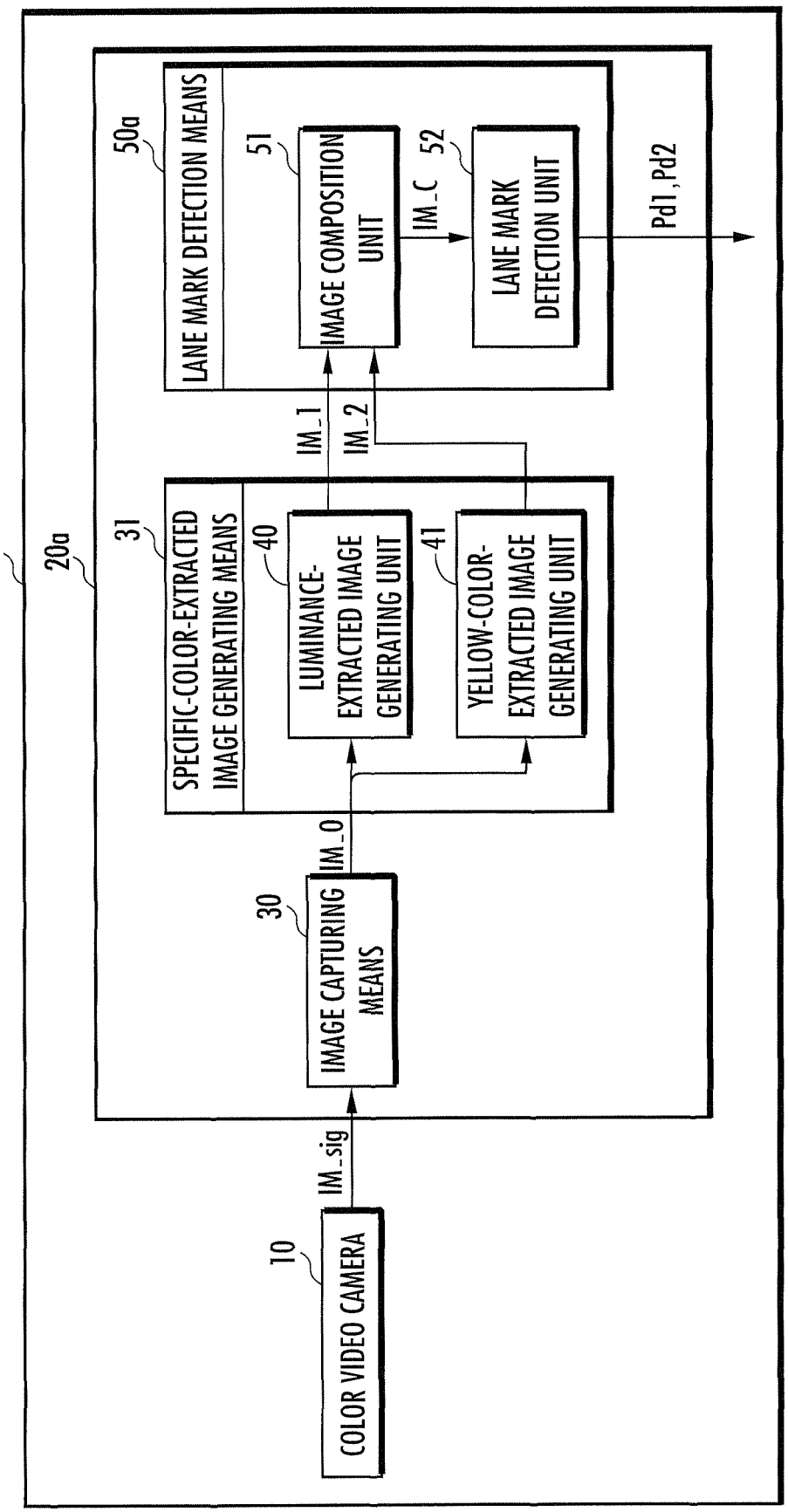
FIG. 1

A first embodiment of the present invention will be described, first. Referring to FIG. 1, a lane mark recognition apparatus 20a mounted on a vehicle 1a detects lane marks (a white line and a yellow line) provided on a road to divide a traffic lane and recognizes the traffic lane.

The lane mark recognition apparatus 20a includes: image capturing means 30 which captures a color image IM_0 by entering a video signal IM_sig output from a color video camera 10 (corresponding to capturing means of the present invention) which is mounted on a vehicle 1a and captures an image of a road ahead of the vehicle 1a; specific-color-extracted image generating means 31 which generates specific-color-extracted images IM_1 and IM_2 with specific colors corresponding to the colors of the lane marks extracted from a color image IM_0; and lane mark detection means 50a which detects the lane marks by using the specific-color-extracted images IM_1 and IM_2.

The specific-color-extracted image generating means 31 includes a luminance-extracted image generating unit 40, which generates a luminance-extracted image IM_1 (corresponding to a first specific-color-extracted image of the present invention) in which "white" (corresponding to a first specific color of the present invention) is treated as a specific color, and a yellow-color-extracted image generating unit 41, which generates a yellow-color-extracted image IM_2 (corresponding to a specific-color-extracted image other than the first specific-color-extracted image of the present invention) in which "yellow" is treated as a specific color.

In addition, the lane mark detection means 50a includes an image composition unit 51 which generates a composite image IM_C by combining the luminance-extracted image IM_1 with the yellow-color-extracted image IM_2 and a lane mark detection unit 52 which detects lane marks (a white line and a yellow line) from the composite image IM_C and outputs position data Pd1 of the white line and position data Pd2 of the yellow line.

Figure 3:
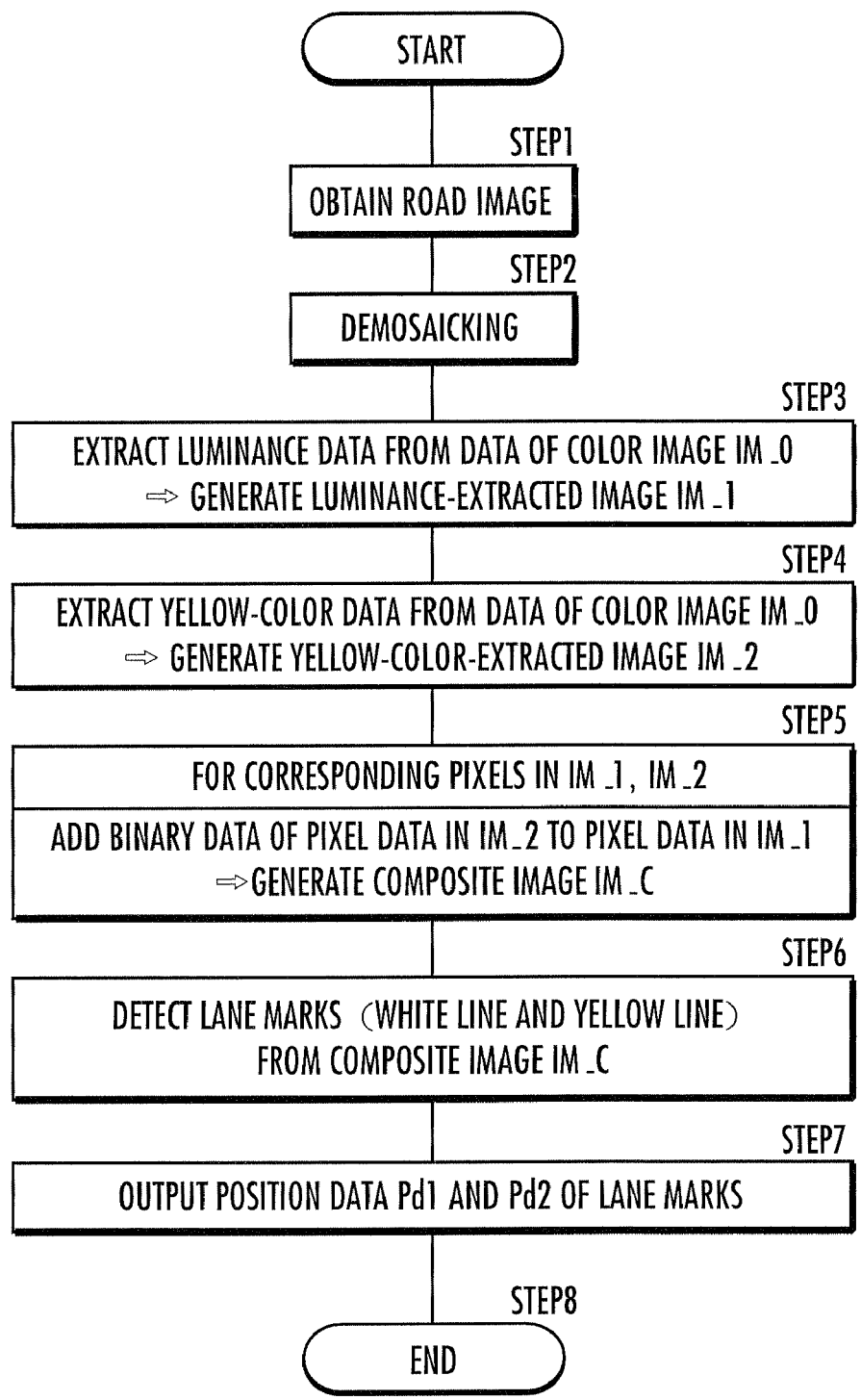
Figure 4:
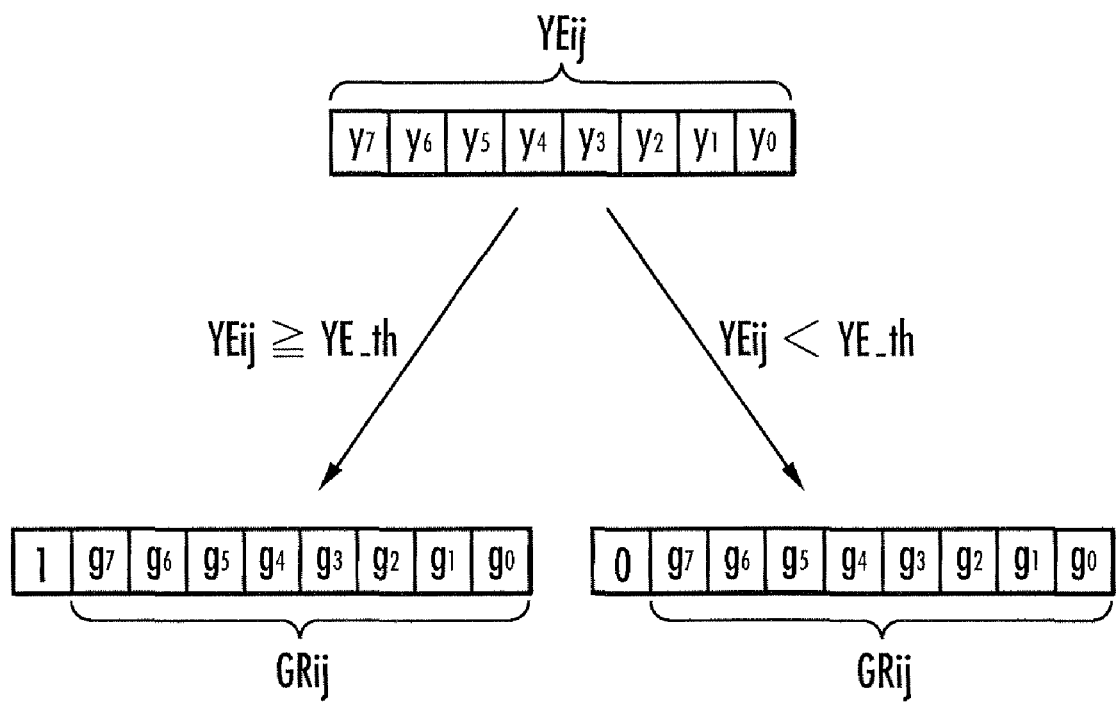

A lane mark recognition process by the lane mark recognition apparatus 20a will be described hereinafter according to the flowchart shown in FIG. 3 with reference to FIGS. 1, 2, and 4. Step 1 and Step 2 in FIG. 3 are processes performed by the image capturing means 30 (See FIG. 1). The image capturing means 30 enters a video signal IM_sig of a road output from the color video camera 10 in step 1 and demosaics color components (R value, G value, B value) of the video signal IM_sig in step 2 to obtain a color image IM_0 (see FIG. 2) formed of m×n pixels having (R value, G value, B value) as data of each pixel.

The next step 3 is a process performed by the luminance-extracted image generating unit 40 (See FIG. 1), in which the luminance-extracted image generating unit 40 performs a vector operation based on the following equation (1) for color components (Rij, Gij, Bij) of each pixel IM_0(i, j) (i=0, 1, - - -, m, j=0, 1, - - -, n) of the color image IM_0.

$$GR_{ij} = (R_{ij}\ G_{ij}\ B_{ij})(KR1\ KG1\ KB1)^T \tag{1}$$

where KR1, KG1, and KB1 are conversion factors for luminance extraction.

Figure 2:
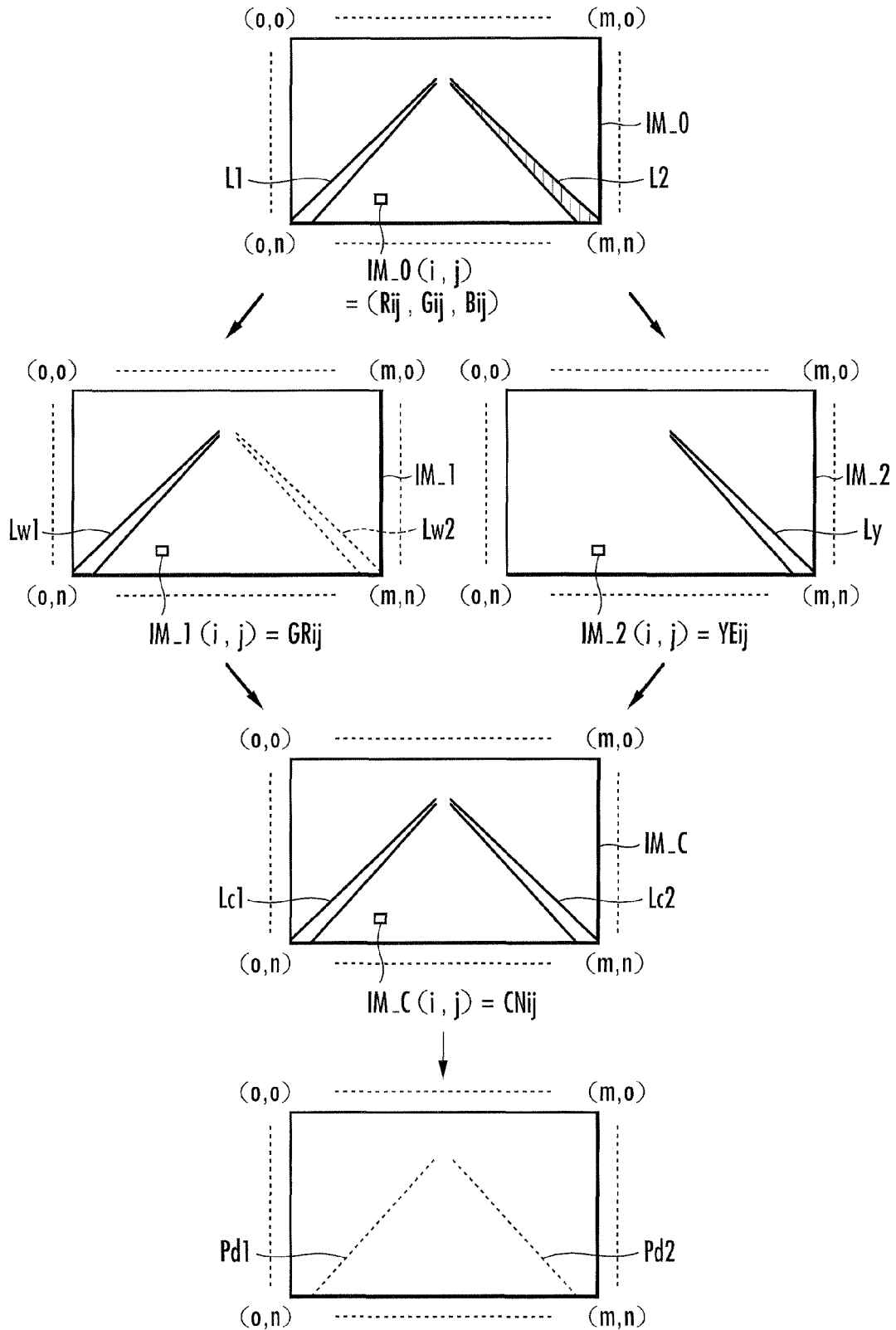

This generates a luminance-extracted image IM_1 having luminance data GRij indicating a luminance level (light and dark) as data of each pixel IM_1(i, j) as shown in FIG. 2.

In addition, step 4 is a process performed by the yellow-color-extracted image generating unit 41 (see FIG. 1), in which the yellow-color-extracted image generating unit 41 performs a vector operation based on the following equation (2) for the color components (Rij, Gij, Bij) of each pixel IM_0(i, j) of the color image IM_0.

$$YEij=(Rij\ Gij\ Bij)(KR2\ KG2\ KB2)^T \qquad (2)$$

where KR2, KG2, and KB2 are conversion factors for yellow color extraction.

This generates a yellow-color-extracted image IM_2 having yellow data YEij indicating a yellow level (a degree of approximation to yellow) as data of each pixel IM_2(i, j) as shown in FIG. 2.

In this regard, if a white line L1 is included as the left-hand lane mark and a yellow line L2 is included as the right-hand lane mark in the color image IM_0 as shown in FIG. 2, the level of luminance data GRij of a pixel in an extracted region Lw2 of the yellow line L2 is lower than the luminance data GRij of a pixel in an extracted region Lw1 of the white line L1 in the luminance-extracted image IM_1.

In this instance, it is necessary to decrease a threshold value to be lower than the level of the luminance data GRij level of the pixel in Lw2 in order to extract Lw2 when detecting the lane marks by binarizing the luminance-extracted image IM_2. The decrease in the threshold value, however, could lead to a decrease in detection accuracy of the lane marks because elements other than the lane marks are easily extracted as noise.

Therefore, the lane mark detection means 50a (See FIG. 1) combines the luminance-extracted image IM_1 with the yellow-color-extracted image IM_2 using the image composition unit 51 in step 5 to generate a composite image IM_C in which both of the white line and the yellow line can be detected accurately.

Referring to FIG. 2, an Ly region where the yellow line L2 is emphasized in the color image IM_0 is extracted in the yellow-color-extracted image IM_2. Therefore, if the level of the yellow-color data YEij of each pixel in the yellow-color-extracted image IM_2 is equal to or higher than a given threshold value YE_th as shown in FIG. 4 (YEij≧YEth), the image composition unit 51 considers data with "1" (corresponding to data at a level equal to or higher than the threshold value for determining whether the data is the first specific color in the first specific-color-extracted image of the present invention) appended thereto as the most significant bit of the luminance data GRij of the corresponding pixel in the luminance-extracted image IM_1 to be data of the corresponding pixel in the composite image IM_C.

If the level of the yellow-color data YEij is less than the threshold value YE_th (YEij<YE_th), the image composition unit 51 considers data with "0" appended thereto as the most significant bit of the luminance data GRij of the corresponding pixel in the luminance-extracted image IM_1 to be corresponding data of the composite image IM_C. As shown in FIG. 2, this generates a composite image IM_C where the level of data of the pixel in a white line Lc1 region on the left side and a yellow line Lc2 region on the right side exceeds a binary threshold value (for example, a mean value in the luminance GRij range. It corresponds to a threshold value for determining whether the data is the first specific color in the first specific-color-extracted image of the present invention) in the luminance-extracted image IM_1.

The next step 6 and step 7 are processes performed by the lane mark detection unit 52 provided in the lane mark detection means 50a. The lane mark detection unit 52 detects the white line and the yellow line by performing binarization of the composite image IM_C, a straight line extraction process, and the like in step 6. Then in step 7, the lane mark detection unit 52 outputs the position data Pd1 of the white line and the position data Pd2 of the yellow line to the main ECU or the like of the vehicle 1a.

Second Embodiment

Subsequently, a second embodiment of the present invention will be described. A vehicle and lane mark recognition apparatus according to the second embodiment differ from those of the first embodiment described above only in the method of generating the composite image IM_C by the image composition unit 51. Hereinafter, the lane mark recognition process by the lane mark recognition apparatus 20a will be described according to the flowchart shown in FIG. 5 with reference to FIGS. 1, 2, and 6.

Figure 5:
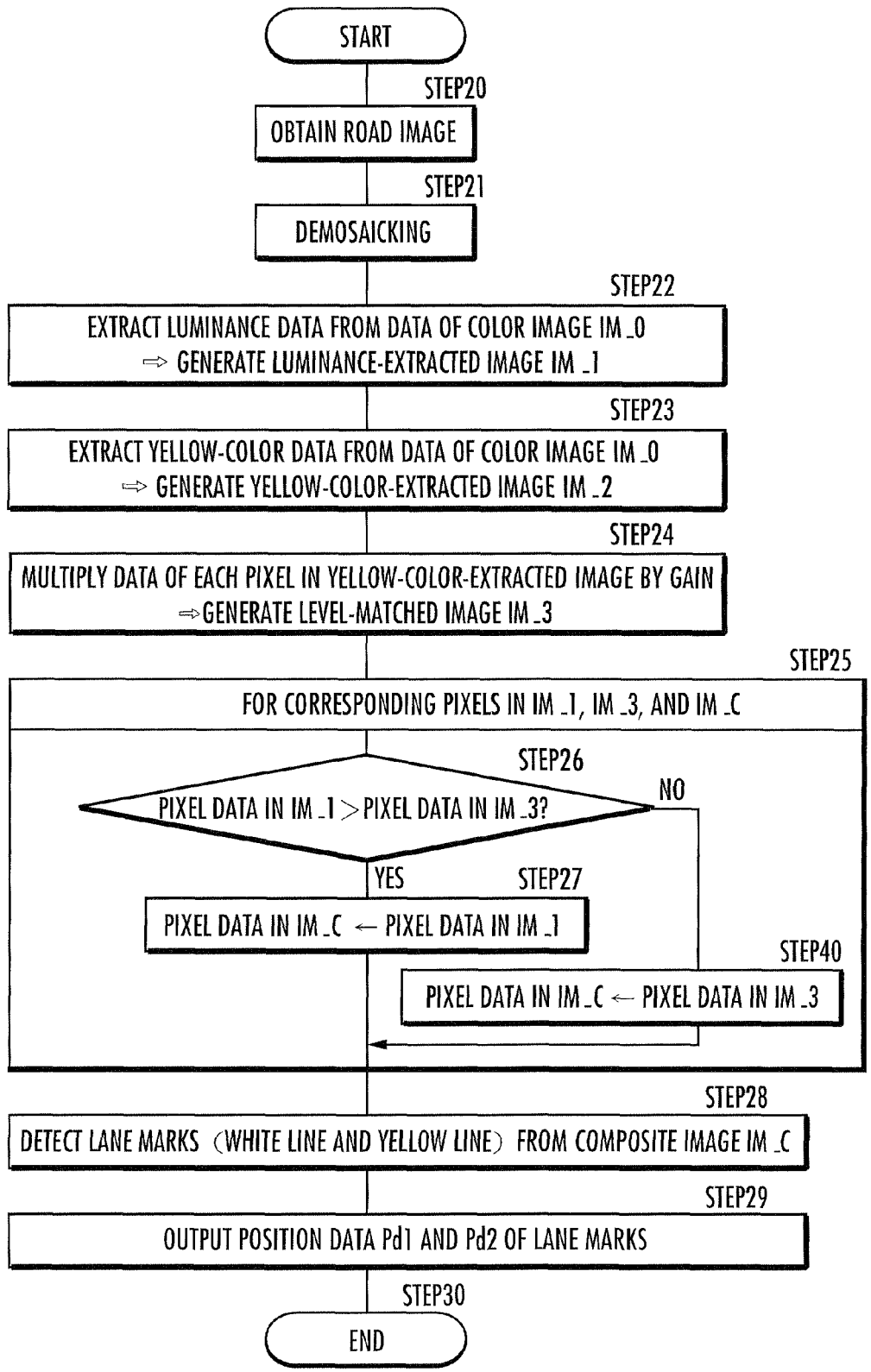
Figure 6:
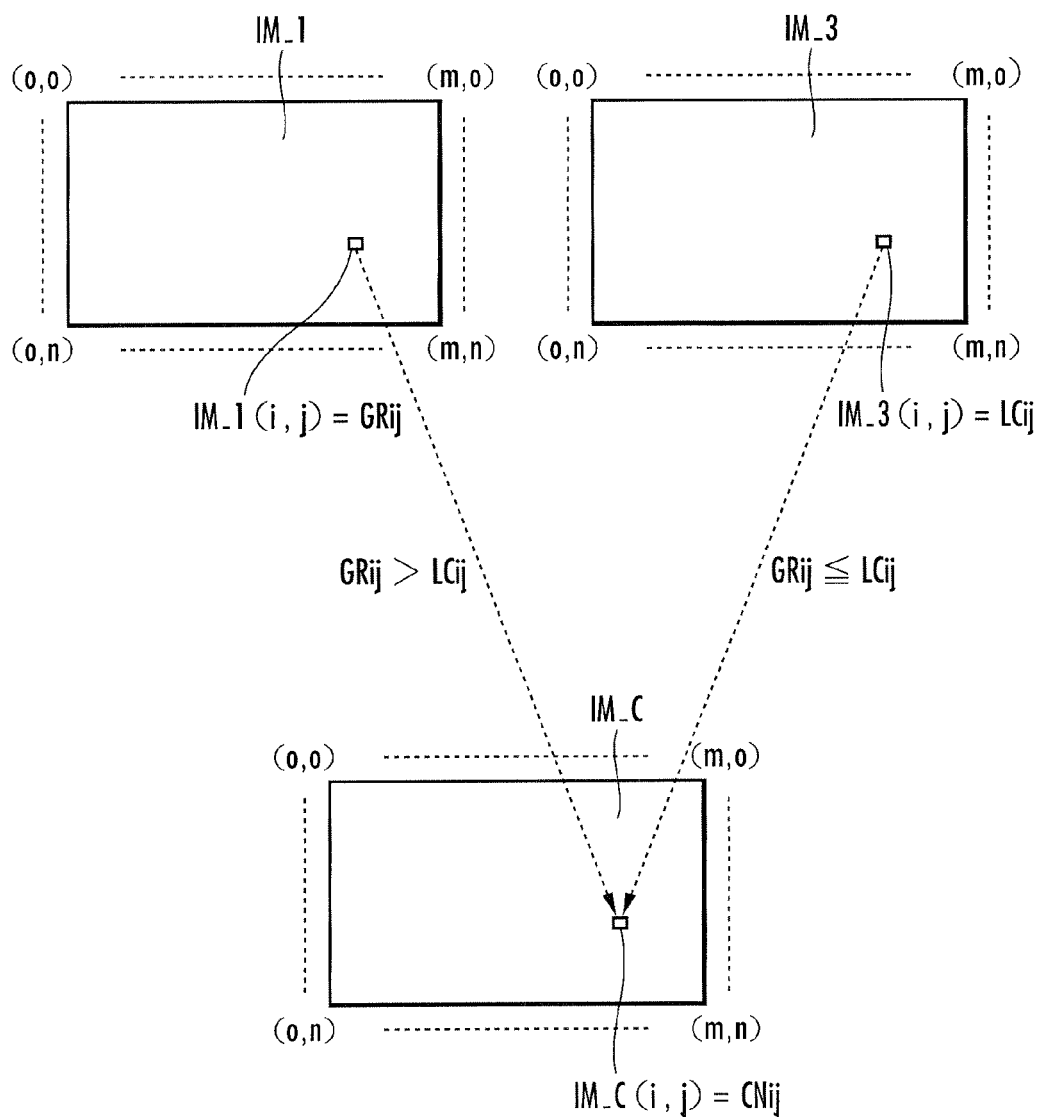

Step 20 to step 23 in FIG. 5 are processes corresponding to step 1 to step 4 in FIG. 3 described above, in which the luminance-extracted image IM_1 and the yellow-color-extracted image IM_2 are generated. The subsequent step 24 to step 27 and step 40 are processes performed by the image composition unit 51. The image composition unit 51 generates a level-matched image IM_3 (See FIG. 6) by multiplying the yellow-color data YEij of each pixel in the yellow-color-extracted image IM_2 by a level matching coefficient GAIN in step 24.

Thereafter, the image composition unit 51 performs the processes of step 26, step 27, and step 40 for data of the corresponding pixels IM_1(i, j), IM_3(i, j), and IM_C(i, j) in the luminance-extracted image IM_1, the level-matched image IM_3, and the composite image IM_C, respectively.

In step 26, the image composition unit 51 compares corresponding pixel data GRij with pixel data LCij in the luminance-extracted image IM_1 and the level-matched image IM_3. If the GRij level is higher than the LCij level, the control proceeds to step 27, in which GRij is considered as data CNij of the corresponding pixel IM_C(i, j) in the composite image IM_C (GRij→CNij). On the other hand, if the GRij level is lower than the LCij level, the control branches to step 40, in which LCij is considered as data CNij of the corresponding pixel IM_C(i, j) in the composite image IM_C (LCij→CNij).

The above execution of the process in step 25 generates a composite image IM_C where the level of the pixel data of the white line region Lc1 and the pixel data of the yellow line region Lc2 each exceed the binary threshold value in the luminance-extracted image IM_1 as shown in FIG. 2, similarly to the first embodiment described above.

Thereafter, the lane mark detection unit 52 detects the white line Lc1 and the yellow line Lc2 by binarizing the composite image IM_C and performing the straight line extraction process and the like in the next step 28 and outputs the position data Pd1 of the white line and the position data Pd2 of the yellow line to the main ECU or the like of the vehicle 1a in step 29.

Third Embodiment

Figure 7:
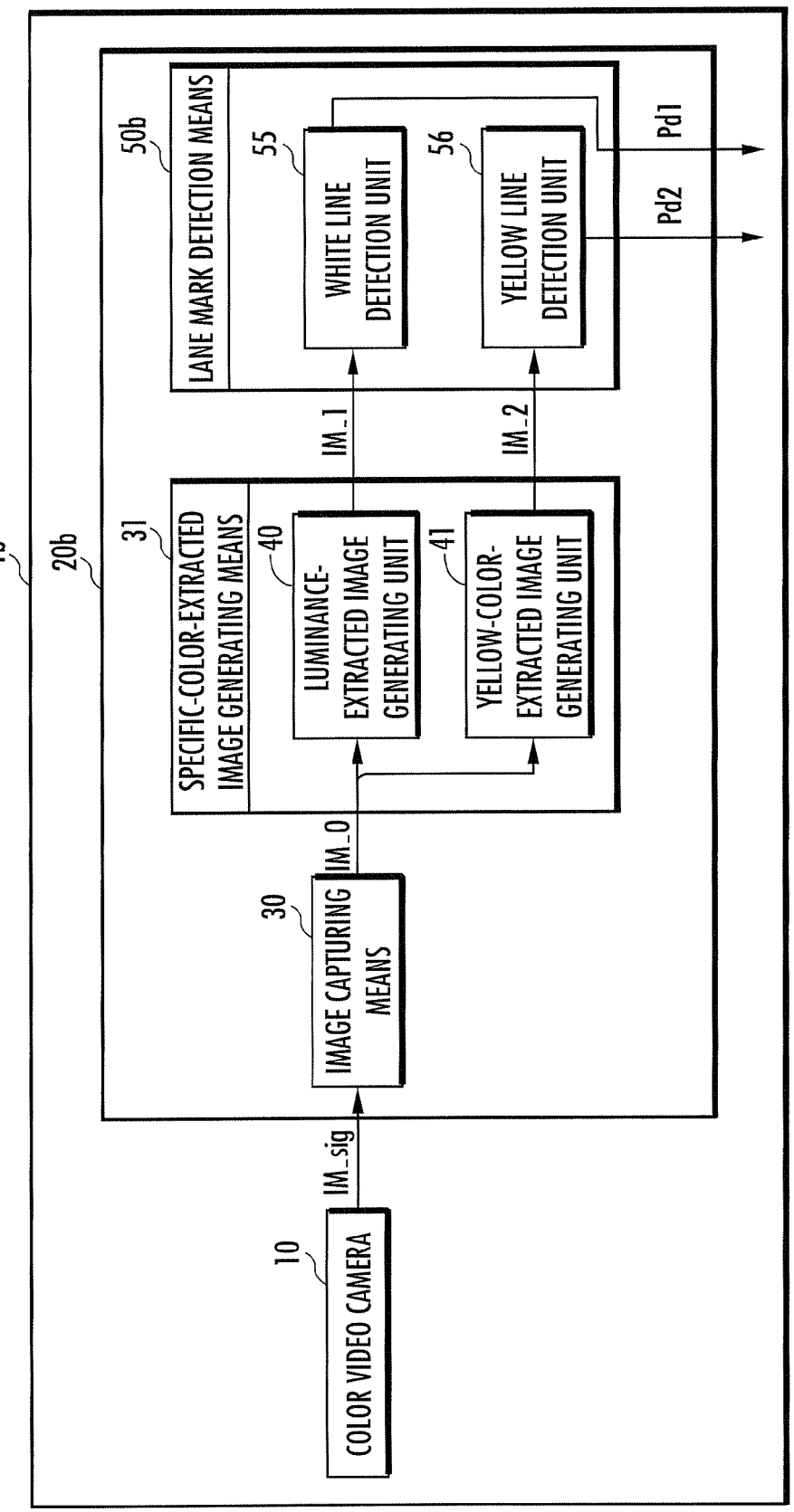

Subsequently, a third embodiment related to the present invention will be described with reference to FIG. 7. The third embodiment differs from the above-mentioned first and second embodiments only in the configuration of lane mark detection means 50b. Therefore, the same reference numerals are appended to the same elements of the vehicle 1a and of the lane mark recognition apparatus 20a as those in FIG. 1, and the description thereof is omitted.

The lane mark detection means 50b includes a white line detection unit 55 and a yellow line detection unit 56. The white line detection unit 55 then detects a white line by binarizing the luminance-extracted image IM_1 generated by the luminance-extracted image generating unit 40 using a threshold value based on the luminance level of the white line and performing the straight line extraction process or the like. In addition, the yellow line detection unit 56 detects a yellow line by binarizing the yellow-color-extracted image IM_2 generated by the yellow-color-extracted image generating unit 41 using a threshold value based on the yellow data level corresponding to the yellow line and performing the straight line extraction process or the like.

Since the threshold value of the binarization can be set in accordance with the luminance data level of the white line region Lw1 with reference to FIG. 2 when the white line is detected from the luminance-extracted image IM_1 as described above, it is possible to detect the white line accurately by preventing a region of a low luminance data level from being extracted as noise.

Additionally, the threshold value of the binarization can be set in accordance with the yellow-color data level of the yellow line region Ly with reference to FIG. 2 when the yellow line is extracted from the yellow-color-extracted image IM_2, and therefore it is possible to detect the yellow line accurately by preventing a region of any other color than yellow from being extracted as noise.

The lane mark detection means 50b then outputs the position data Pd1 of the white line detected by the white line detection unit 55 and the position data Pd2 of the yellow line detected by the yellow line detection unit 56 to the main ECU or the like of the vehicle 1b.

Although the above first and second embodiments show an example of extracting the luminance-extracted image corresponding to the white lane mark and the yellow-color-extracted image corresponding to the yellow lane mark regarding the specific colors of the present invention, the present invention is also applicable to a case of detecting a lane mark of any other color by performing the same processing of extracting a pixel of the color of the lane mark to be detected.

Furthermore, although the above first to third embodiments show an example of detecting lane marks of two colors, namely white and yellow, the present invention is also applicable to a case of detecting lane marks of three or more colors by generating specific-color-extracted images obtained by extracting the specific colors corresponding to the colors of the lane marks from a color image.

Still further, although the white line and the yellow line are detected as lane marks in the above first and second embodiments, the same effect of the present invention can be achieved also in the case of detecting other types of lane marks such as Botts Dots, cat's eye, and the like).

Moreover, although the image data having the color components (R value, G value, B value) for each pixel is used in the above first and second embodiments, the present invention is also applicable to a case of using image data having other types of color components (CMY, HSV, and the like).

INDUSTRIAL APPLICABILITY

As described hereinabove, the vehicle and the lane mark recognition apparatus of the present invention are useful as those capable of improving the detection accuracy of lane marks in a road where there are lane marks of different colors, and they are adapted for use in detecting the positions of the lane marks.

The invention claimed is:

1. A vehicle comprising:
an imaging means;
an image capturing means which captures a color image of a road via the imaging means;
a specific-color-extracted image generating means which generates a plurality of specific-color-extracted images by performing a process of generating a specific-color-extracted image, which is obtained by extracting pixels of a specific color corresponding to the color of a lane mark in the road from the color image, with respect to a plurality of specific colors; and
a lane mark detection means which detects the lane marks of the specific colors from a composite image based on the plurality of specific-color-extracted images generated by the specific-color-extracted image generating means.

2. The vehicle according to claim 1, wherein the lane mark detection means generates the composite image by performing a process of adding data of a level equal to or higher than a threshold value for determining whether the specific color is a first specific color in a first specific-color-extracted image, in the case where a corresponding pixel in a specific-color-extracted image other than the first specific-color-extracted image has a specific color, for data of each pixel in the first specific-color-extracted image; the first specific-color-extracted image, which is obtained by extracting pixels of the first specific color, among the plurality of specific-color-extracted images generated by the specific-color-extracted image generating means.

3. The vehicle according to claim 1, wherein the lane mark detection means generates the composite image by performing a process of comparing data levels of corresponding pixels between the first specific-color-extracted image, which is obtained by extracting the first specific-color data, among the plurality of specific-color-extracted images generated by the specific-color-extracted image generating means and a level-matched image; the level-matched image, which is obtained by matching the data level of the pixel of the specific color in the specific-color-extracted image other than the first specific-color-extracted image to the data level of the pixel of the first specific color in the first specific-color-extracted image, and considering data of the highest level as data of the corresponding pixel in the composite image.

4. A lane mark recognition apparatus, comprising:
an image capturing means which captures a color image of a road via an imaging means;
a specific-color-extracted image generating means which generates a plurality of specific-color-extracted images by performing a process of generating a specific-color-extracted image, which is obtained by extracting pixels of a specific color corresponding to the color of a lane mark in the road from the color image, with respect to a plurality of specific colors; and
a lane mark detection means which detects the lane marks of the specific colors from a composite image based on the plurality of specific-color-extracted images generated by the specific-color-extracted image generating means.

5. The lane mark recognition apparatus according to claim 4, wherein the lane mark detection means generates the composite image by performing a process of adding data of a level equal to or higher than a threshold value for determining whether the specific color is a first specific color in a first specific-color-extracted image, in the case where a corresponding pixel in a specific-color-extracted image other than the first specific-color-extracted image has a specific color, for data of each pixel in the first specific-color-extracted image; the first specific-color-extracted image, which is obtained by extracting pixels of the first specific color, among the plurality of specific-color-extracted images generated by the specific-color-extracted image generating means.

6. The lane mark recognition apparatus according to claim 4, wherein the lane mark detection means generates the composite image by performing a process of comparing data levels of corresponding pixels between the first specific-color-extracted image, which is obtained by extracting the first specific-color data, among the plurality of specific-color-extracted images generated by the specific-color-extracted image generating means and a level-matched image; the level-matched image, which is obtained by matching the data level of the pixel of the specific color in the specific-color-extracted image other than the first specific-color-extracted image to the data level of the pixel of the first specific color in the first specific-color-extracted image, and considering data of the highest level as data of the corresponding pixel in the composite image.

* * * * *